US012602776B2

(12) United States Patent
Wu et al.

(10) Patent No.: US 12,602,776 B2
(45) Date of Patent: Apr. 14, 2026

(54) METHOD AND APPARATUS FOR ANALYZING BIOCHIP IMAGE, COMPUTER DEVICE, AND STORAGE MEDIUM

(71) Applicant: BOE TECHNOLOGY GROUP CO., LTD., Beijing (CN)

(72) Inventors: Qiong Wu, Beijing (CN); Mengjun Hou, Beijing (CN); Xiangguo Ma, Beijing (CN); Kai Geng, Beijing (CN); Zhukai Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 675 days.

(21) Appl. No.: 17/927,025

(22) PCT Filed: Feb. 23, 2021

(86) PCT No.: PCT/CN2021/077355
§ 371 (c)(1),
(2) Date: Nov. 22, 2022

(87) PCT Pub. No.: WO2022/178653
PCT Pub. Date: Sep. 1, 2022

(65) Prior Publication Data
US 2023/0230229 A1      Jul. 20, 2023

(51) Int. Cl.
*G06T 7/00*          (2017.01)
*G01N 21/64*        (2006.01)
(Continued)

(52) U.S. Cl.
CPC ....... *G06T 7/0012* (2013.01); *G01N 21/6456* (2013.01); *G06T 3/40* (2013.01);
(Continued)

(58) Field of Classification Search
None
See application file for complete search history.

(56) References Cited

U.S. PATENT DOCUMENTS

2018/0232879 A1      8/2018   Chang et al.

FOREIGN PATENT DOCUMENTS

CN          1570649 A        1/2005
CN          103236065 A      8/2013
(Continued)

OTHER PUBLICATIONS

Mathworks.com , What Is Camera Calibration? The Wayback Machine—https://web.archive.org/web/20200515074505/https://www.mathworks.com/help/vision/ug/camera-calibration.html (Year: 2020).*

(Continued)

*Primary Examiner* — Xiaoyun R Xu
(74) *Attorney, Agent, or Firm* — HOUTTEMAN LAW LLC

(57)          ABSTRACT

A method for analyzing a biochip image is provided, including: (S1) acquiring and preprocessing the biochip image to obtain a preprocessed image; (S2) performing a correction for angle deflection on the preprocessed image to obtain a deflection-corrected image; and (S3) performing an enhancement processing on the deflection-corrected image, and identifying a positive or negative of an area of interest in the preprocessed image according to an image on which the enhancement processing has been performed. An apparatus (100) for analyzing a biochip image, a method for analyzing an image, a computer device (200) and a storage medium are disclosed.

20 Claims, 7 Drawing Sheets

(51) Int. Cl.

| | |
|---|---|
| *G06T 3/40* | (2006.01) |
| *G06T 5/20* | (2006.01) |
| *G06T 5/50* | (2006.01) |
| *G06T 5/70* | (2024.01) |
| *G06T 7/11* | (2017.01) |
| *G06T 7/80* | (2017.01) |

(52) U.S. Cl.
CPC .................. *G06T 5/20* (2013.01); *G06T 5/50* (2013.01); *G06T 5/70* (2024.01); *G06T 7/11* (2017.01); *G06T 7/80* (2017.01); *G06T 2207/10064* (2013.01); *G06T 2207/20061* (2013.01); *G06T 2207/20224* (2013.01); *G06T 2207/30072* (2013.01)

(56) References Cited

FOREIGN PATENT DOCUMENTS

| | | | |
|---|---|---|---|
| CN | 103542935 | A | 1/2014 |
| CN | 103236065 | B | 11/2015 |
| CN | 107274349 | A | 10/2017 |
| CN | 107708568 | A | 2/2018 |
| CN | 108254238 | A | 7/2018 |
| CN | 109234158 | A | 1/2019 |
| CN | 110047107 | A | 7/2019 |
| CN | 110310334 | A | 10/2019 |
| CN | 111257296 | A | 6/2020 |
| WO | WO2011073386 | A1 | 6/2011 |

OTHER PUBLICATIONS

Sangeethapriya, S.A.G., Gaussian modulated hyperbolic tangent high pass filter for edge detection in noisy images, arXiv, Cornell University, 2020 (Year: 2020).*

Sharkas, M. et al. The Contourlet Transform with the Principal Component Analysis for Palmprint Recognition, 2010 Second International Conference on Computational Intelligence, Communication Systems and Networks. (Year: 2010).*

Manickam, A. et al. A Fully Integrated CMOS Fluorescence Biochip for DNA and RNA Testing, IEEE Journal of Solid-State Circuits, vol. 52, No. 11, Nov. 2017, 2857-2870 (Year: 2017).*

European Patent Office, Eesr, Application No. 21927101.2, Jul. 7, 2023.

Chen et al., "MIA: An Effective and Robust Microarray Image Analysis System with Unstructured Information Management Architecture," Conference Paper, Aug. 1, 2007, pp. 423-428, Proceedings of the IEEE International Conference on Information Reuse and Integration, Aug. 13-15, 2007, Las Vegas, Nevada, USA.

* cited by examiner

10

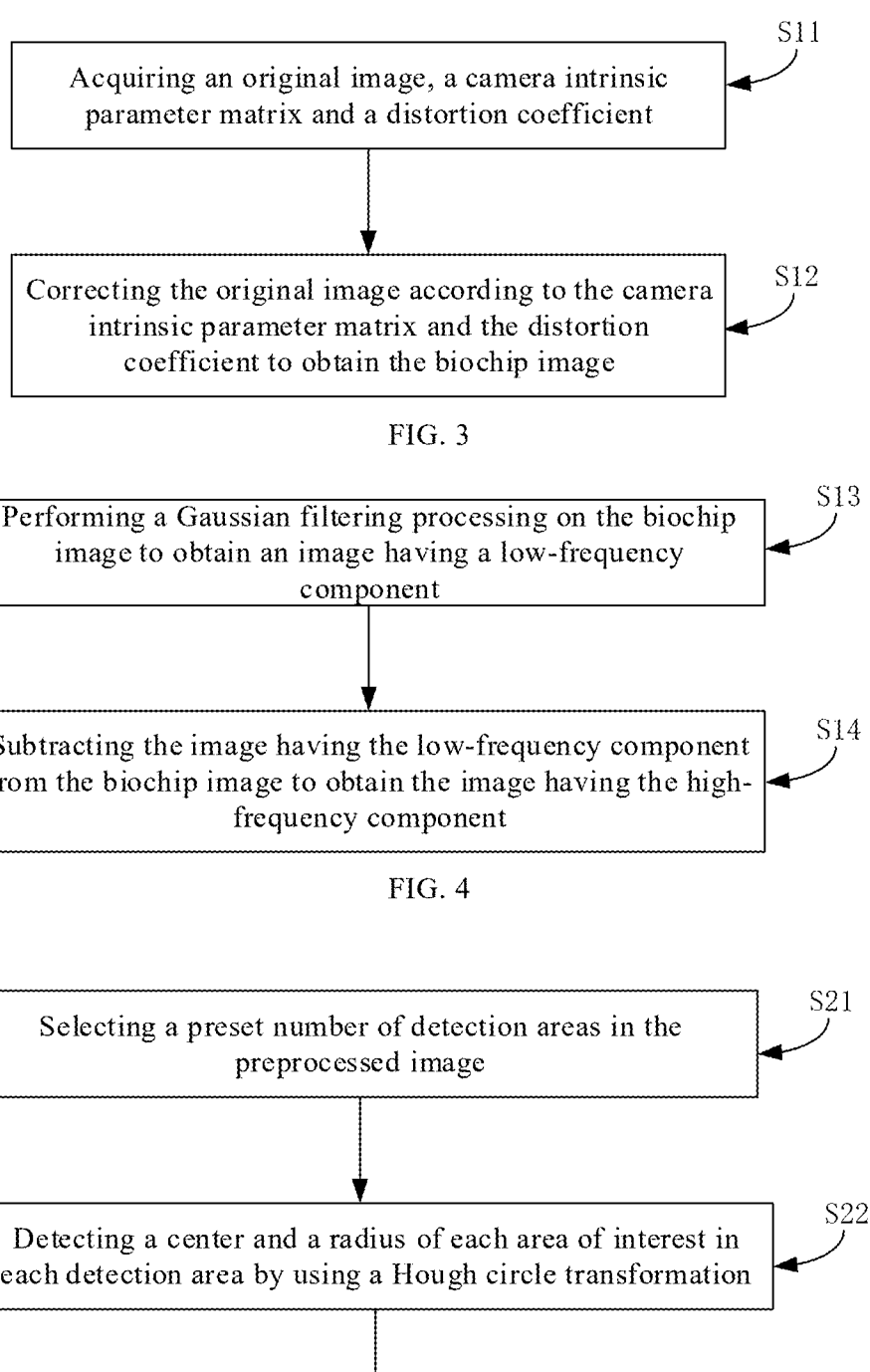

S11

Acquiring an original image, a camera intrinsic parameter matrix and a distortion coefficient

S12

Correcting the original image according to the camera intrinsic parameter matrix and the distortion coefficient to obtain the biochip image

Performing a Gaussian filtering processing on the biochip image to obtain an image having a low-frequency component

S14

Subtracting the image having the low-frequency component from the biochip image to obtain the image having the high-frequency component

Selecting a preset number of detection areas in the preprocessed image

S22

Detecting a center and a radius of each area of interest in each detection area by using a Hough circle transformation

S23

Forming a circle according to the center and the radius of each area of interest, to determine the area of interest and segment the area of interest

FIG. 5

Performing an expansion processing on the segmented image to connect adjacent areas of interest in a preset direction    S24

Performing a principal component analysis on a contour of the detection area having a maximum contour in the image on which the expansion processing is performed, to obtain a contour direction    S25

Determining an image deflection angle according to the contour direction, to correct the preprocessed image and to obtain the deflection-corrected image    S26

FIG. 6

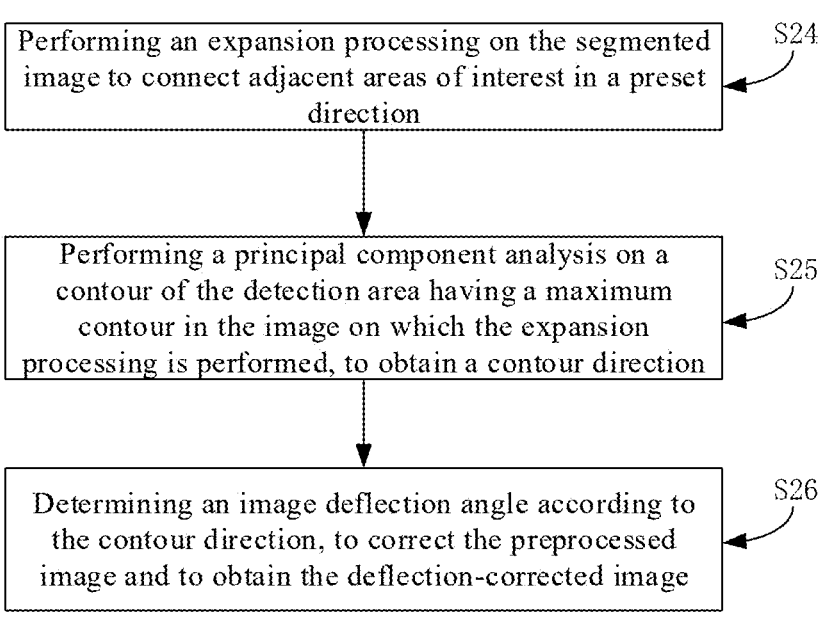
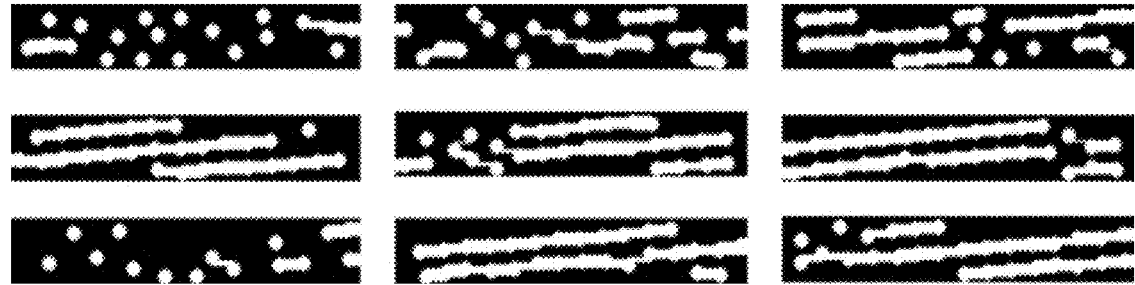
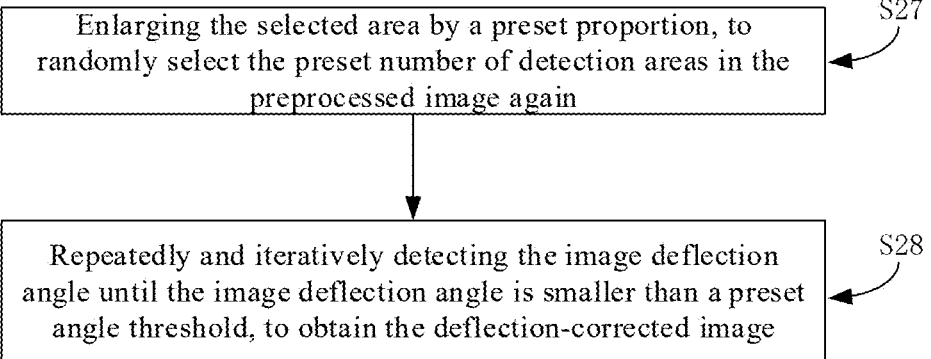

FIG. 7

Enlarging the selected area by a preset proportion, to randomly select the preset number of detection areas in the preprocessed image again    S27

Repeatedly and iteratively detecting the image deflection angle until the image deflection angle is smaller than a preset angle threshold, to obtain the deflection-corrected image    S28

FIG. 8

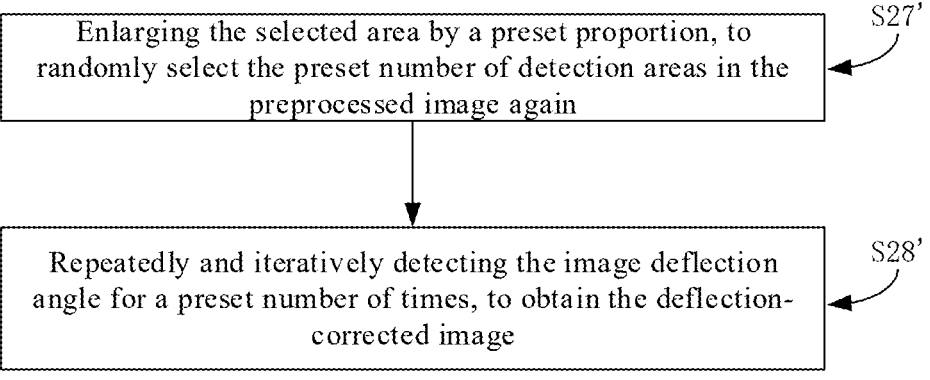

S27'

Enlarging the selected area by a preset proportion, to randomly select the preset number of detection areas in the preprocessed image again

S28'

Repeatedly and iteratively detecting the image deflection angle for a preset number of times, to obtain the deflection-corrected image

FIG. 9

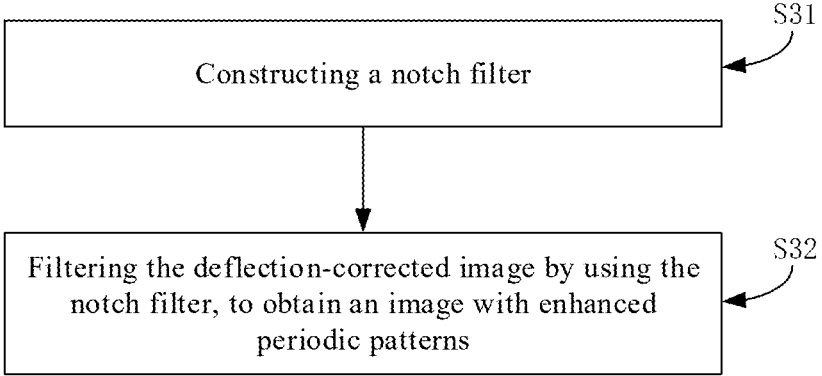

S31

Constructing a notch filter

S32

Filtering the deflection-corrected image by using the notch filter, to obtain an image with enhanced periodic patterns

FIG. 10

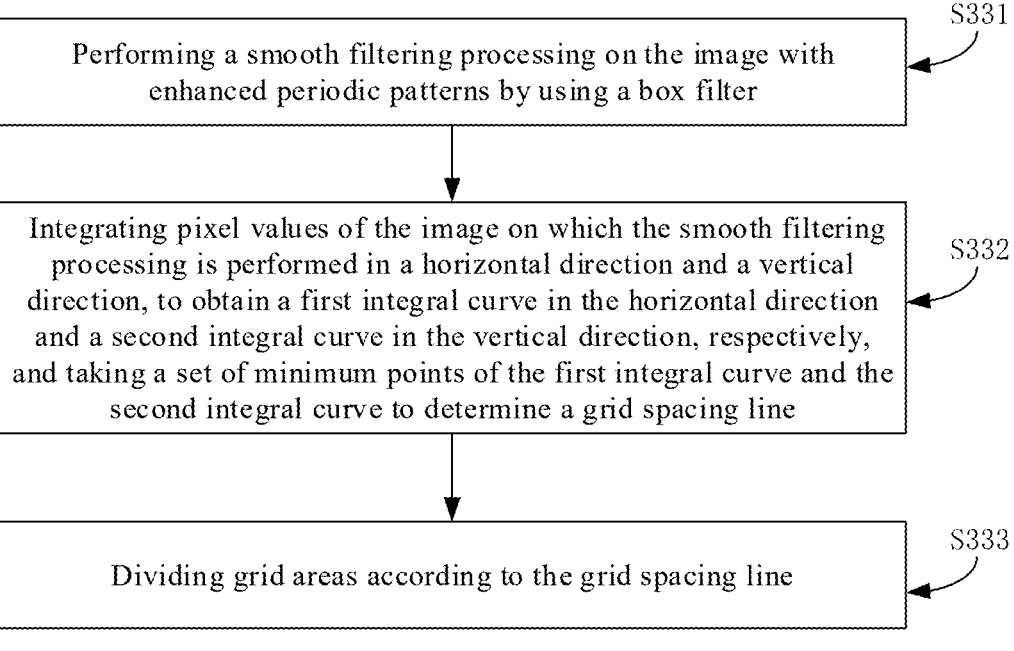

S331

Performing a smooth filtering processing on the image with enhanced periodic patterns by using a box filter

S332

Integrating pixel values of the image on which the smooth filtering processing is performed in a horizontal direction and a vertical direction, to obtain a first integral curve in the horizontal direction and a second integral curve in the vertical direction, respectively, and taking a set of minimum points of the first integral curve and the second integral curve to determine a grid spacing line

S333

Dividing grid areas according to the grid spacing line

FIG. 13

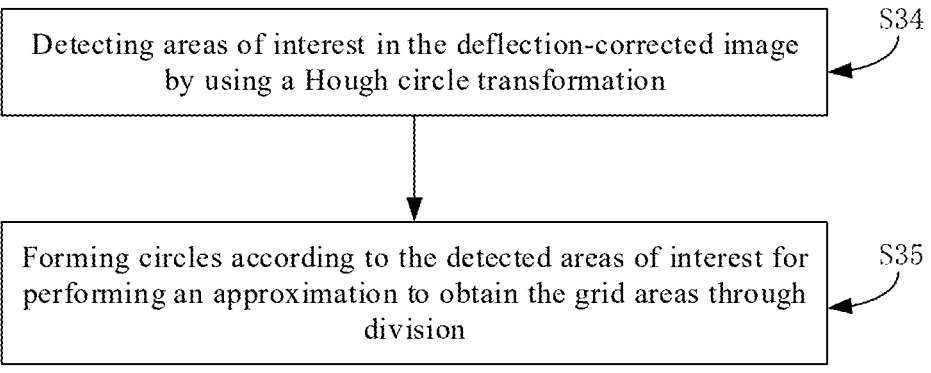

S34

Detecting areas of interest in the deflection-corrected image by using a Hough circle transformation

S35

Forming circles according to the detected areas of interest for performing an approximation to obtain the grid areas through division

FIG. 14

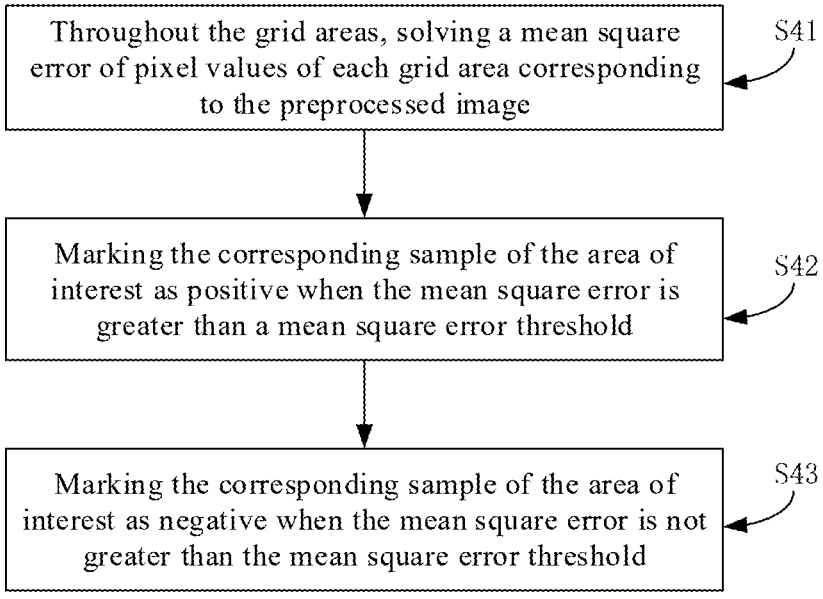

| Throughout the grid areas, solving a mean square error of pixel values of each grid area corresponding to the preprocessed image | S41 |

| Marking the corresponding sample of the area of interest as positive when the mean square error is greater than a mean square error threshold | S42 |

| Marking the corresponding sample of the area of interest as negative when the mean square error is not greater than the mean square error threshold | S43 |

FIG. 15

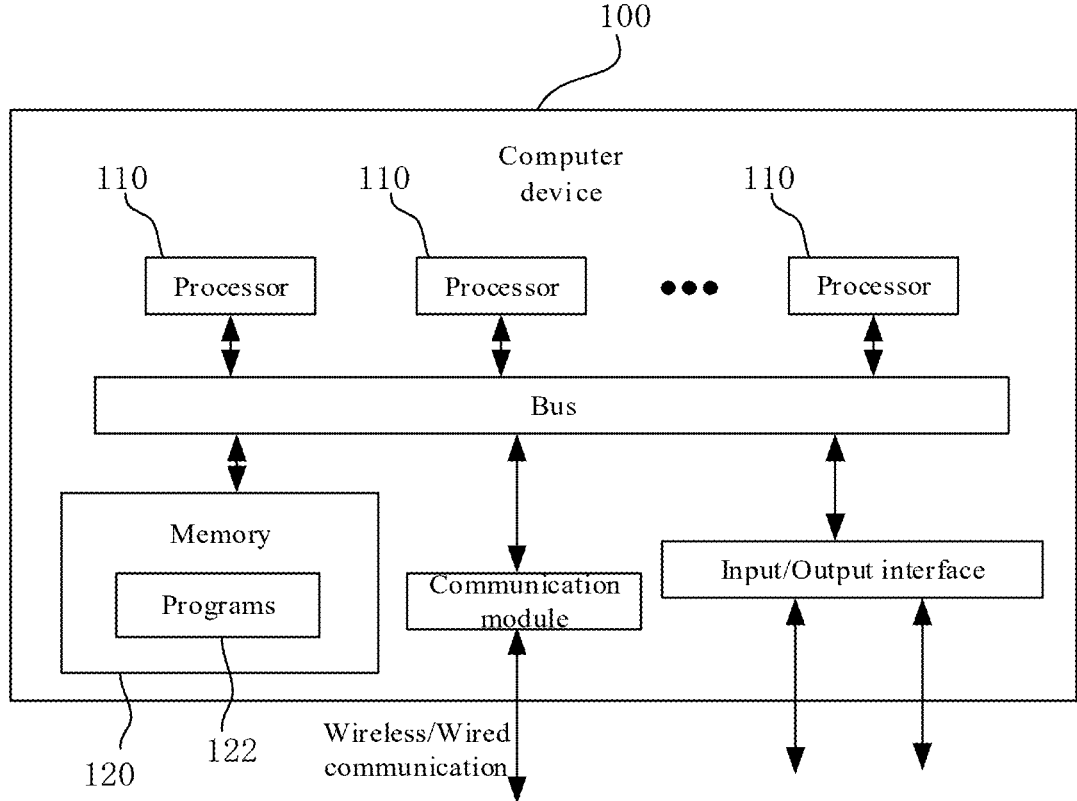

FIG. 16

METHOD AND APPARATUS FOR ANALYZING BIOCHIP IMAGE, COMPUTER DEVICE, AND STORAGE MEDIUM

TECHNICAL FIELD

The present disclosure relates to the field of biological detection technology, and in particular to a method for analyzing a biochip image and an apparatus for analyzing a biochip image, a method for analyzing an image, a computer device, and a storage medium.

BACKGROUND

In the biological medical field, an array type biochip technology is an important tool for a gene analysis and an accurate diagnosis for diseases, and can overcome a defect in a traditional method in which tests are needed to be repeated for many times, effectively saves manpower and reduces the number of samples, improves a precision of detection, and thus, is one of important means for detecting a biological sample in the modern biological medical field. Automatically detecting a biochip usually includes automatically obtain the number of rows and the number of columns of the biochip and position information of the biochip by extracting features of an image, to detect and analyze a positive or negative of a sample point. It is generally in the related art to analyze and process an image with a high signal-to-noise ratio in an ideal scene. However, there is no method for effectively processing an image with a high throughput and a low signal-to-noise ratio.

SUMMARY

The present disclosure provides a method for analyzing a biochip image, an apparatus for analyzing a biochip image, a method for analyzing an image, a computer device and a storage medium.

An embodiment of the present disclosure provides a method for analyzing a biochip image, including: acquiring and preprocessing the biochip image to obtain a preprocessed image; performing a correction for angle deflection on the preprocessed image to obtain a deflection-corrected image; and performing an enhancement processing on the deflection-corrected image, and identifying a positive or negative of an area of interest in the preprocessed image according to an image on which the enhancement processing is performed.

In some embodiments, the acquiring and preprocessing the biochip image to obtain a preprocessed image includes: acquiring an original image, a camera intrinsic parameter matrix and a distortion coefficient; and correcting the original image according to the camera intrinsic parameter matrix and the distortion coefficient to obtain the biochip image.

In some embodiments, the method further includes: calibrating the camera for shooting by using a calibration plate and by adopting a traditional calibration method, to obtain the camera intrinsic parameter matrix and the distortion coefficient.

In some embodiments, the original image is a fluorescent image of a biochip in which a biochemical reaction has occurred.

In some embodiments, the preprocessed image includes an image having a high-frequency component, and the acquiring and preprocessing the biochip image to obtain a preprocessed image includes: performing a Gaussian filtering processing on the biochip image to obtain an image having a low-frequency component; and subtracting the image having the low-frequency component from the biochip image to obtain the image having the high-frequency component.

In some embodiments, the performing a correction for angle deflection on the preprocessed image to obtain a deflection-corrected image includes: selecting a preset number of detection areas in the preprocessed image; detecting a center and a radius of each area of interest in each detection area by using a Hough circle transformation; and forming a circle according to the center and the radius of each area of interest, to determine the area of interest and segment the areas of interest.

In some embodiments, the selecting a preset number of detection areas in the preprocessed image includes: selecting a corresponding detection area within a predetermined area of the preprocessed image.

In some embodiments, each detection area is a rectangular area, and includes at least two rows or at least two columns of areas of interest.

In some embodiments, the performing a correction for angle deflection on the preprocessed image to obtain a deflection-corrected image includes: performing an expansion processing on the segmented image to connect adjacent areas of interest in a preset direction; performing a principal component analysis on a contour of the detection area having a maximum contour in the image on which the expansion processing is performed, to obtain a contour direction; and determining an image deflection angle according to the contour direction, to correct the preprocessed image and to obtain the deflection-corrected image.

In some embodiments, the performing a correction for angle deflection on the preprocessed image to obtain a deflection-corrected image includes: enlarging the selected area by a preset proportion, to randomly select the preset number of detection areas in the preprocessed image again; and repeatedly and iteratively detecting the image deflection angle until the image deflection angle is smaller than a preset angle threshold, to obtain the deflection-corrected image.

In some embodiments, a range of the preset angle threshold is determined by a following conditional expression:

$$\cos\theta - (\max\{m, n\} - 1) \cdot \sin\theta > \frac{2 \text{ rad}}{dist};$$

where θ is the preset angle threshold, dist is the area interval of the areas of interest, rad is an area radius of the area of interest, m is the number of rows of the areas of interest in each detection area, and n is the number of columns of the areas of interest in each detection area.

In some embodiments, the performing a correction for angle deflection on the preprocessed image to obtain a deflection-corrected image includes: enlarging the selected area by a preset proportion, to randomly select the preset number of detection areas in the preprocessed image again; and repeatedly and iteratively detecting the image deflection angle for a preset number of times, to obtain the deflection-corrected image.

In some embodiments, the performing an enhancement processing on the deflection-corrected image, and identifying a positive or negative of an area of interest in the preprocessed image according to an image on which the enhancement processing is performed includes: constructing a notch filter; and filtering the deflection-corrected image by using the notch filter, to obtain an image with enhanced periodic patterns.

In some embodiments, the performing an enhancement processing on the deflection-corrected image, and identifying a positive or negative of an area of interest in the preprocessed image according to an image on which the enhancement processing is performed includes: performing a smooth filtering processing on the image with enhanced periodic patterns by using a box filter; integrating pixel values of the image on which the smooth filtering processing is performed in a horizontal direction and a vertical direction, to obtain a first integral curve in the horizontal direction and a second integral curve in the vertical direction, respectively, and taking a set of minimum points of the first integral curve and the second integral curve to determine a grid spacing line; and dividing grid areas according to the grid spacing line.

In some embodiments, a length or width of an operator of the box filter satisfies a following conditional expression:

$$\left\lceil \frac{dist}{2} - rad \right\rceil < b < \left\lceil \frac{dist}{2} \right\rceil;$$

where b is the length or width of the operator of the box filter; dist is the area interval of the areas of interest, rad is an area radius of the area of interest.

In some embodiments, the performing an enhancement processing on the deflection-corrected image, and identifying a positive or negative of an area of interest in the preprocessed image according to an image on which the enhancement processing is performed includes: throughout the grid areas, solving a mean square error of pixel values of each grid area corresponding to the preprocessed image; marking the corresponding sample of the area of interest as positive in response to the mean square error being greater than a mean square error threshold; and marking the corresponding sample of the area of interest as negative in response to the mean square error being not greater than the mean square error threshold.

In some embodiments, the method further includes: outputting an identification result for the positive or negative of the area of interest.

An embodiment of the present disclosure further provides a method for analyzing an image, including the steps of the method for analyzing a biochip image according to any of the above embodiments.

An embodiment of the present disclosure further provides an apparatus for analyzing a biochip image, including: an acquisition module configured to acquire and preprocess the biochip image to obtain a preprocessed image; an correction module configured to perform a correction for angle deflection on the preprocessed image to obtain a deflection-corrected image; and a processing module configured to perform a periodic pattern enhancement processing on the deflection-corrected image and divide grids for chambers; and perform an enhancement processing on the deflection-corrected image, and identify a positive or negative of an area of interest in the preprocessed image according to an image on which the enhancement processing is performed.

An embodiment of the present disclosure further provides a computer device, including a processor and a memory, wherein the memory stores computer programs thereon which, when executed by the processor, implement the method for analyzing a biochip image according to any of the above embodiments, or the method for analyzing an image according to the above embodiment.

An embodiment of the present disclosure further provides a storage medium having computer programs stored thereon which, when executed by one or more processors, implement the method for analyzing a biochip image according to any of the above embodiments, or the method for analyzing an image according to the above embodiment.

According to the method for analyzing a biochip image and the apparatus for analyzing a biochip image, the computer device, and the storage medium of the embodiment of the present disclosure, a fluorescent image with a high throughput and a low signal-to-noise ratio of the array type biochip can be effectively identified. Particularly, in the improved processing method, the problem of uneven fluorescent illumination of a microscopic chip can be solved through filtering; and an automatic analysis for the positioning of chambers and the determination of the positive or negative of samples can be successfully realized through the grid division.

Additional aspects and advantages of embodiments of the present disclosure will be set forth in part in the following description and, in part, will be obvious from the following description, or may be learned by practicing embodiments of the present disclosure.

BRIEF DESCRIPTION OF DRAWINGS

Above and/or additional aspects and advantages of the present disclosure will become apparent and readily appreciated from the following description of the embodiments in conjunction with the accompanying drawings, in which:

FIG. 3 is another schematic flow chart of a method for analyzing a biochip image according to an embodiment of the present disclosure.

FIG. 4 is another schematic flow chart of a method for analyzing a biochip image according to an embodiment of the present disclosure.

FIG. 5 is another schematic flow chart of a method for analyzing a biochip image according to an embodiment of the present disclosure.

FIG. 6 is another schematic flow chart of a method for analyzing a biochip image according to an embodiment of the present disclosure.

FIG. 7 is a schematic diagram of contours obtained after an expansion process is performed on the segmented reaction chambers according to an embodiment of the present disclosure.

FIG. 8 is another schematic flow chart of a method for analyzing a biochip image according to an embodiment of the present disclosure.

FIG. 9 is another schematic flow chart of a method for analyzing a biochip image according to an embodiment of the present disclosure.

FIG. 10 is another schematic flow chart of a method for analyzing a biochip image according to an embodiment of the present disclosure.

FIG. 13 is another schematic flow chart of a method for analyzing a biochip image according to an embodiment of the present disclosure.

FIG. 14 is another schematic flow chart of a method for analyzing a biochip image according to an embodiment of the present disclosure.

FIG. 15 is another schematic flow chart of a method for analyzing a biochip image according to an embodiment of the present disclosure.

FIG. 16 is a schematic diagram of blocks of a computer device according to an embodiment of the present disclosure.

DETAIL DESCRIPTION OF EMBODIMENTS

Figure 1:
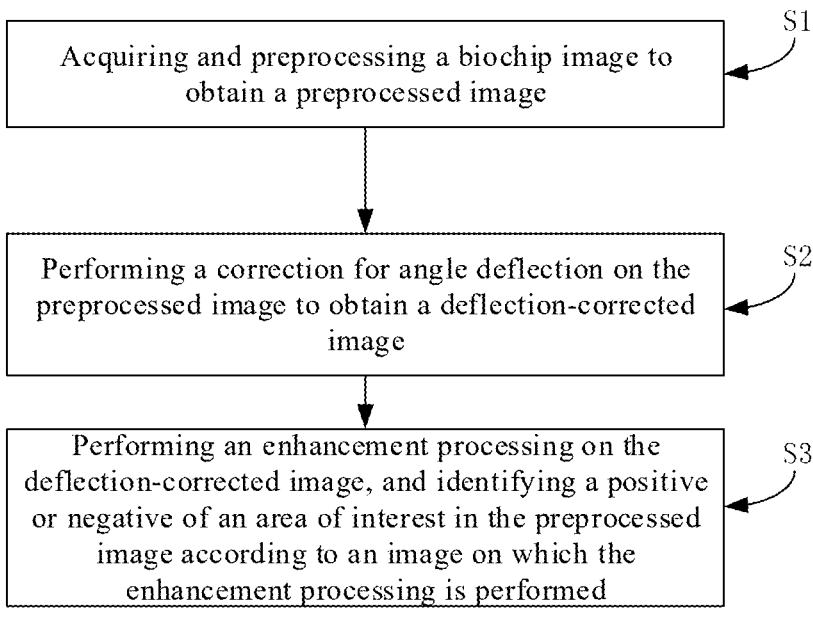
FIG. 1 is a schematic flow chart of a method for analyzing a biochip image according to an embodiment of the present disclosure.

Embodiments of the present disclosure will be described below in detail, examples of the embodiments of the present disclosure are illustrated in the accompanying drawings, wherein like or similar reference numerals refer to the same or similar elements or elements having the same or similar functions throughout the description. The embodiments described below with reference to the accompanying drawings are exemplary only for explaining the present disclosure and are not to be construed as limiting the present disclosure.

Figure 2:
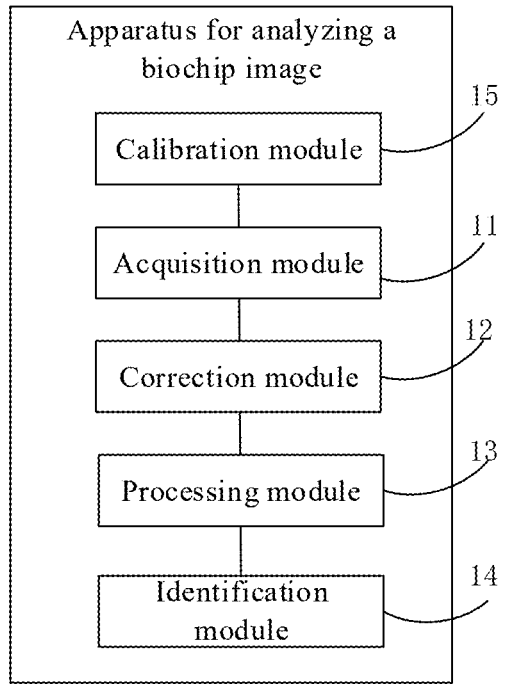
FIG. 2 is a schematic diagram of blocks of an apparatus for analyzing a biochip image according to an embodiment of the present disclosure.

Referring to FIG. 1 and FIG. 2, in the method for analyzing a biochip image according to an embodiment of the present disclosure, a fluorescent image with a high throughput and a low signal-to-noise ratio of the array type biochip is identified; and an automatic analysis for the positioning of chambers and the determination of the positive or negative of samples is realized.

The method for analyzing a biochip image according to the embodiment of the present disclosure can be applied to an apparatus 10 for analyzing a biochip image according to the embodiment of the present disclosure, that is, the apparatus 10 for analyzing a biochip image according to the embodiment of the present disclosure may use the method for analyzing a biochip image according to the embodiment of the present disclosure, to identify a fluorescent image with a high throughput and a low signal-to-noise ratio of the array type biochip; and to realize an automatic analysis for the positioning of chambers and the determination of the positive or negative of samples.

In some embodiments, the method for analyzing a biochip image includes:

Step S1, acquiring and preprocessing a biochip image to obtain a preprocessed image;

Step S2, performing a correction for angle deflection on the preprocessed image to obtain a deflection-corrected image (a corrected image or an image on which the correction for angle deflection is performed);

Step S3, performing an enhancement processing on the deflection-corrected image, and identifying a positive or negative of an area of interest in the preprocessed image according to an image on which the enhancement processing is performed.

Specifically, the apparatus 10 for analyzing a biochip image includes an acquisition module 11, a correction module 12 and a processing module 13; and step S1 may be implemented by the acquisition module 11, step S2 may be implemented by the correction module 12, and step S3 may be implemented by the processing module 13. That is, the acquisition module 11 may be configured to acquire and process the biochip image to obtain the preprocessed image.

The correction module 12 may be configured to randomly select a detection area, detect a reaction chamber within the detection area for processing to obtain a deflection-corrected image. The processing module 13 may be configured to perform an enhancement processing on the deflection-corrected image and identify a positive or negative of an area of interest in the preprocessed image according to an image on which the enhancement processing is performed.

In the method for analyzing a biochip image and the apparatus for analyzing a biochip image of the embodiment of the present disclosure, a fluorescent image with a high throughput and a low signal-to-noise ratio of the array type biochip can be effectively identified. Particularly, in the improved processing method, the problem of uneven fluorescent illumination of a microscopic chip can be solved through filtering; and an automatic analysis for the positioning of chambers and the determination of the positive or negative of samples can be realized through the enhancement processing on the image.

Referring to FIG. 3, in some embodiments, step S1 includes:

Step S11, acquiring an original image, a camera intrinsic parameter matrix and a distortion coefficient; and Step S12, correcting the original image according to the camera intrinsic parameter matrix and the distortion coefficient to obtain the biochip image.

Specifically, the step S11 and the step S12 may be implemented by the acquisition module 11. That is, the acquisition module 11 may be configured to acquire the original image, the camera intrinsic parameter matrix and the distortion coefficient, and to correct the original image according to the camera intrinsic parameter matrix and the distortion coefficient to obtain the biochip image.

It can be understood that a distortion generated in the original image captured by the camera may be corrected by acquiring the camera intrinsic parameter matrix and the distortion coefficient, so that the corrected biochip image can show the characteristics of the biochip more truly. In this way, the effectiveness and the accuracy for analyzing the biochip can be advantageously ensured.

In some examples, the biochip may have a quadrilateral shape, and a plurality of reaction chambers are arranged in an array on the biochip. It should be noted that in the embodiment of the present disclosure, as an example, the area of interest is an area in the biochip image where the reaction chambers are located.

In some embodiments, the method for analyzing a biochip image includes: calibrating the camera for shooting by using a calibration plate and by adopting a traditional calibration method, to obtain the camera intrinsic parameter matrix and the distortion coefficient.

Specifically, the apparatus 10 for analyzing a biochip image may include a calibration module 15 configured to calibrate the camera for shooting by using the calibration plate and by adopting the traditional calibration method, to obtain the camera intrinsic parameter matrix and the distortion coefficient.

When parameters of the camera are calibrated by using the calibration plate, the calibration plate may be provided with predetermined patterns, such as grid patterns or black and white square patterns, the camera captures an image of the calibration plate at a certain shooting distance. In this way, the image of the calibration plate may be compared with the patterns of the calibration plate, and the camera intrinsic parameter matrix and the distortion parameter related to camera shooting are obtained by combining the shooting distance and an offset of a characteristic point in the image of the calibration plate with respect to a corresponding characteristic point in the patterns of the calibration plate.

It should be noted that in some embodiments, the camera intrinsic parameter matrix and the distortion coefficient may be pre-calibrated and pre-stored in the camera or the apparatus 10 for analyzing a biochip image, so that the apparatus for analyzing a biochip image may obtain the corresponding camera intrinsic parameter matrix and the distortion coefficient from the camera, or determine the camera intrinsic parameter matrix and the distortion coefficient according to the number or model of the camera. Alternatively, in other embodiments, every time the biochip image is acquired, the apparatus 10 for analyzing a biochip image may detect the camera intrinsic parameter matrix and the distortion coefficient corresponding to the camera, so that the validity of the camera intrinsic parameter matrix and the distortion coefficient can be ensured.

In some embodiments, the original image is a fluorescent image of the biochip in which a biochemical reaction has occurred.

When a biological sample to be detected is loaded on the biochip and a biochemical reaction occurs, a corresponding fluorescent image of the biochip may be acquired by using a specific device. It is understood that different reaction chambers may show the same color and intensity or different colors and intensities in the fluorescent image.

Referring to FIG. 4, in some embodiments, the preprocessed image includes an image having a high-frequency component, and step S1 includes:

Step S13, performing a Gaussian filtering processing on the biochip image to obtain an image having a low-frequency component; and Step S14, subtracting the image having the low-frequency component from the biochip image to obtain the image having the high-frequency component.

Specifically, the step S13 and the step S14 may be implemented by the acquisition module 11. That is, the acquisition module 11 may be configured to perform the Gaussian filtering processing on the biochip image to obtain the image having the low-frequency component, and to subtract the image having the low-frequency component from the biochip image to obtain the image having the high-frequency component.

Therefore, the image having the low-frequency component is obtained by the Gaussian filtering, and then the image having the high-frequency component is obtained by subtracting the low-frequency component in the biochip image, so that the high-frequency filtering is realized, and the problem of uneven fluorescent illumination of the microscopic chip is solved.

Alternatively, in other embodiments, the preprocessed image may not be limited to the above image having the high-frequency component, but may be obtained as a grayscale image, the image having the low-frequency component, an edge detection image, or the like as needed. The grayscale image may be obtained through image graying processing, the image having the low-frequency component may be obtained through low-frequency component extraction processing, and the edge detection image may be obtained through image edge extraction processing. In addition, the preprocessed image may be obtained by using one or more of the above processing methods in a preset order, which is not limited herein.

Referring to FIG. 5, in some embodiments, step S2 includes:

Step S21, selecting a preset number of detection areas in the preprocessed image;

Step S22, detecting a center and a radius of each area of interest in each detection area by using a Hough circle transformation (cvHoughCircles); and Step S23, forming a circle according to the center and the radius of each area of interest, to determine the area of interest and segment the area of interest.

Specifically, step S21, step S22, and step S23 may be implemented by the correction module 12. That is, the correction module 12 may be configured to select the preset number of detection areas in the preprocessed image; detect the center and the radius of each area of interest in each detection area by using the Hough circle transformation (cvHoughCircles); and form the circle according to the center and the radius of each area of interest, to determine the area of interest and segment the areas of interest.

By taking the area of interest as an area where a reaction chamber is located in the image as an example, when an arrangement of the reaction chambers is detected, it needs to determine a position of each reaction chamber in each detection area. Each reaction chamber is generally circular, so that a center and a radius of each chamber may be detected through the Hough transformation. Further, the position of each reaction chamber is determined according to the center and the radius of each chamber, and then, the segmentation of the reaction chambers may be realized.

In some embodiments, step S21 includes: selecting a corresponding detection area within a predetermined area of the preprocessed image.

The correction module 12 may be configured to select the corresponding detection area within the predetermined area of the preprocessed image.

The predetermined area may be empirically set by a user, or automatically selected through an algorithm. Alternatively, the detection area may also be a randomly selected area in the preprocessed image, and is not limited here.

In some embodiments, each detection area is a rectangular area, and includes at least two rows or at least two columns of areas of interest.

It is understood that when the deflection correction is performed on the image having the high-frequency component to obtain a deflection-corrected image, it is necessary to determine a deflection angle of the image having the high-frequency component. The reaction chambers on the biochip are generally arranged in an array, i.e., the areas of interest are generally arranged in an array, so that the deflection angle of the image (an image deflection angle) may be detected according to an arrangement direction of the chambers. Advantageously, the rectangular area is used for determining a relative deflection angle between a long side direction of the selected detection area and the arrangement direction of the reaction chambers.

Each detection area includes the at least two rows or at least two columns of areas of interest, which may ensure the detection of the arrangement direction of the reaction chambers.

It should be noted that a size of each detection area may be flexibly set according to an area interval of the areas of interest, a radius of each area of interest, or the like, and is not limited herein.

Alternatively, in other embodiments, a shape of each detection area may not be limited to the rectangular shape. Other suitable shapes such as a square, a triangle, a circle, a parallelogram, etc. may be selected as needed, which is not limited herein.

In some embodiments, the preset number of the detection areas selected each time may include a plurality of detection areas. The plurality of detection areas may have different directions, so as to improve the efficiency and accuracy of detecting the deflection angle of the image. For example, the preset number of detection areas selected each time may include nine detection areas.

Referring to FIGS. 6 and 7, in some embodiments, step S2 includes:

Step S24, performing an expansion processing on the segmented image to connect adjacent areas of interest in a preset direction;

Step S25, performing a principal component analysis on a contour of the detection area having a maximum contour in the image on which the expansion processing is performed, to obtain a contour direction; and Step S26, determining an image deflection angle according to the contour direction, to correct the preprocessed image and to obtain the deflection-corrected image.

Specifically, steps S24, S25 and S26 may be implemented by the correction module 12. That is, the correction module 12 may be configured to perform an expansion processing on the segmented image to connect adjacent areas of interest in a preset direction; perform a principal component analysis on a contour of the detection area having a maximum contour in the image on which the expansion processing is performed, to obtain a contour direction; and determine a deflection angle of the image according to the contour direction, to correct the preprocessed image and to obtain the deflection-corrected image.

In step S24, each segmented area of interest may be expanded in a preset direction, so that a contour of each area of interest extends in the preset direction, and contours of adjacent areas of interest are connected to each other. In one example, the preset direction may be the long side direction of the rectangular detection area. FIG. 7 is a schematic diagram showing contours of all nine detection areas obtained after the expansion process is performed on the areas of interest in the nine detection areas according to the preset direction.

After the contours of the areas of interest are connected together, in step S25, the principal component analysis (PCA) is performed on the contour of the detection area having the maximum contour, to obtain the contour direction. It is understood that the maximum contour is generally formed by connecting the plurality of areas of interest adjacent to each other, so that the obtained contour direction may be used as the arrangement direction of the reaction chambers in one example. In particular, when the plurality of detection areas are included, the PCA principal component analysis may be performed on the contour of one of the plurality of detection areas having the maximum contour, to obtain the contour direction.

Thus, in step S25, the image deflection angle of the biochip image and the preprocessed image may be determined according to the contour direction, and the correction for the deflection angle may be performed on the biochip image and/or the preprocessed image, to obtain the deflection-corrected image.

Thus, in the present disclosure, the detection area having the maximum contour is formed by connecting areas of interest adjacent to each other in a same direction, and then, the principal component analysis (PCA) is used, so that the problem of the detection for the deflection angle can be solved.

Referring to FIG. 8, in some embodiments, step S2 includes:

Step S27, enlarging the selected area by a preset proportion, to randomly select the preset number of detection areas in the preprocessed image again; and Step S28, repeatedly and iteratively detecting the image deflection angle until the image deflection angle is smaller than a preset angle threshold, to obtain the deflection-corrected image.

Specifically, steps S27 and S28 may be implemented by the correction module 12. That is, the correction module 12 may be configured to enlarge the selected area by a preset proportion, to randomly select the detection areas again; and repeatedly and iteratively detect the image deflection angle until the image deflection angle is smaller than a preset angle threshold, to obtain the deflection-corrected image.

Therefore, the image deflection angle is repeatedly and iteratively detected with the detection areas with different sizes, and therefore the accuracy of the image deflection angle can be ensured.

In some embodiments, a range of the preset angle threshold may be determined by the following conditional expression:

$$\cos\theta - (\max\{m, n\} - 1) \cdot \sin\theta > \frac{2\,rad}{dist}$$

where $\theta$ is the preset angle threshold, dist is the area interval of the areas of interest, rad is an area radius of the area of interest, m is the number of rows of the areas of interest in each detection area, and n is the number of columns of the areas of interest in each detection area.

It should be noted that in some embodiments, when shooting the biochip image, the camera may be precisely aligned by a hardware instrument, so that the deflection-corrected image may be directly determined from the biochip image shot after the precise alignment. In this case, the process of detecting the image deflection angle may be omitted. In other embodiments, a sign may be provided on the biochip itself. After the biochip image is obtained, a relative coordinate system may be constructed by identifying the sign on the biochip, to obtain a deflection angle of the biochip with respect to the camera, so as to obtain the deflection-corrected image by correction.

Alternatively, the correction for angle deflection may not be limited to the above embodiments, and a suitable correction method may be selected as needed, so that the apparatus 10 for analyzing a biochip image may determine that the areas of interest on the biochip satisfy relative positions arranged laterally or longitudinally according to the deflection-corrected image, which is not limited herein.

Referring to FIG. 9, in some embodiments, step S2 includes:

Step S27', enlarging the selected area by a preset proportion, to randomly select the preset number of detection areas in the preprocessed image again; and Step S28', repeatedly and iteratively detecting the image deflection angle for a preset number of times, to obtain the deflection-corrected image.

Specifically, steps S27' and S28' may be implemented by the correction module 12. That is, the correction module 12 may be configured to enlarge the selected area by the preset proportion, to randomly select the detection areas again; and repeatedly and iteratively detect the image deflection angle for the preset number of times, to obtain the deflection-corrected image.

Therefore, the image deflection angle is repeatedly and iteratively detected for the preset number of times with the detection areas with different sizes, and therefore the accuracy of the image deflection angle can be ensured. In one example, the preset number of times may be preset by a system or set by a user as needed. For example, the preset number of times may be six times.

Figure 11:
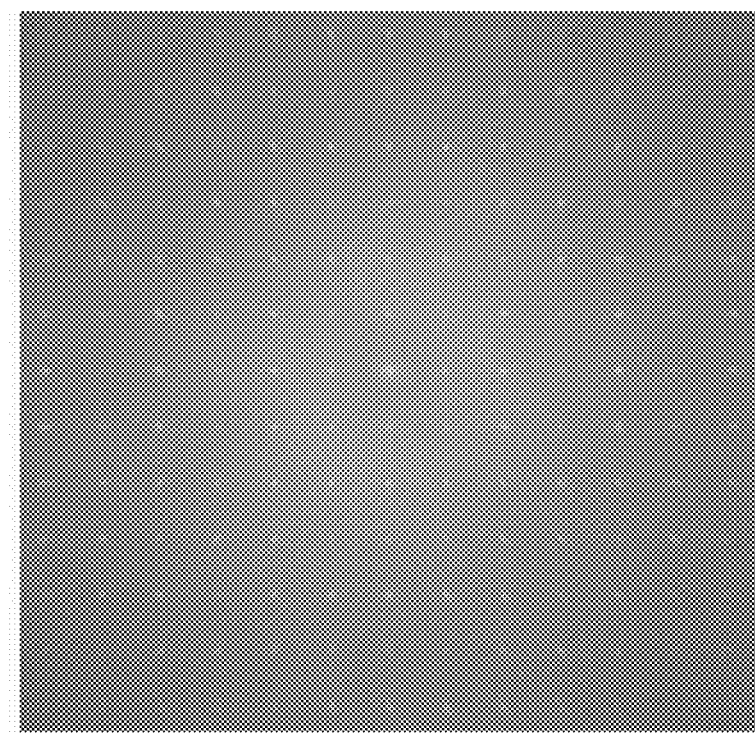
FIG. 11 is a schematic diagram of an amplitude obtained by transforming the biochip image through the Fourier transform into a frequency domain according to an embodiment of the present disclosure.
Figure 12:
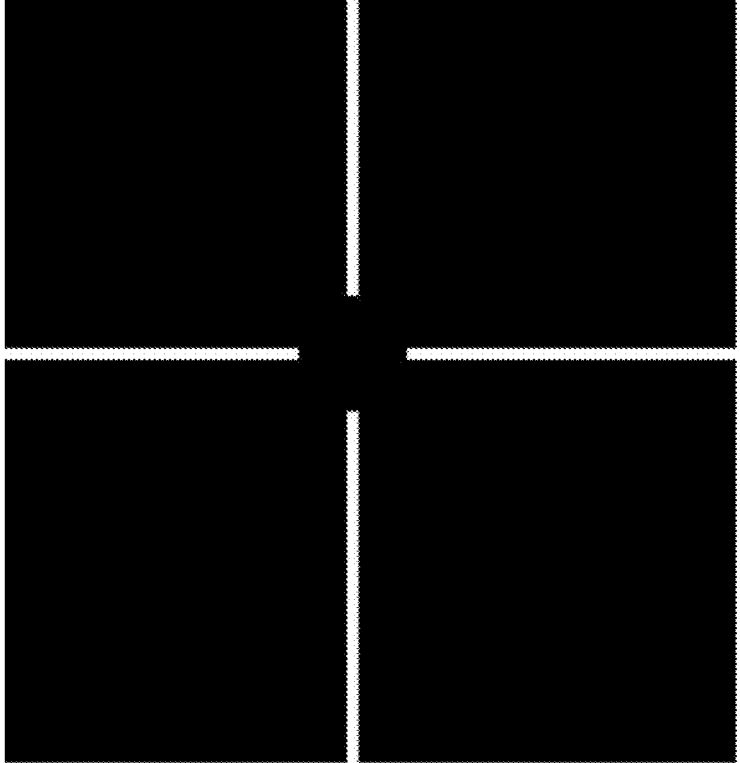
FIG. 12 is a schematic diagram of a constructed filter according to an embodiment of the present disclosure.

Referring to FIGS. 10, 11 and 12, in some embodiments, step S3 includes: Step S31, constructing a notch filter; and Step S32, filtering the deflection-corrected image by using the notch filter, to obtain an image with enhanced periodic patterns.

Specifically, step S31 and step S32 may be implemented by the processing module 13. That is, the processing module 13 may be configured to construct the notch filter; and filter the deflection-corrected image by using the notch filter, to obtain the image with enhanced periodic patterns.

Therefore, with the periodic pattern prior of the array type biochip, the notch filter is constructed, so that a noise caused by a surface dirt, a sample injection process and a reaction process is weakened to the maximum extent.

In one example, in an amplitude map obtained by transforming the biochip image through the Fourier transform into a frequency domain, as shown in FIG. 11, most of the image information is concentrated in a low-frequency part, so that most of the image noise can be removed by filtering the image information in a central part. The information in a central vertical direction and a central horizontal direction is the periodic pattern information that is most easily filtered out, so that the notch filter constructed in step S31 may be shown in FIG. 11, for removing the image noise in a non-periodic pattern.

The notch filter is used, which can reduce the time and space complexity of an algorithm of the method for analyzing a biochip image of the embodiment of the present disclosure, and have a looser requirement on a performance of a hardware device, thereby reducing the cost and improving the operation efficiency while ensuring the effect.

Referring to FIG. 13, in some embodiments, step S33 includes:

Step S331, performing a smooth filtering processing on the image with enhanced periodic patterns by using a box filter;

Step S332, integrating pixel values of the image on which the smooth filtering processing is performed in a horizontal direction and a vertical direction, to obtain a first integral curve in the horizontal direction and a second integral curve in the vertical direction, respectively, and taking a set of minimum points of the first integral curve and the second integral curve to determine a grid spacing line; and Step S333, dividing grid areas according to the grid spacing line.

Specifically, steps S331, S332, and S333 may be implemented by the processing module 13. That is, the processing module 13 may be configured to perform a smooth filtering processing on the image with enhanced periodic patterns by using a box filter; integrate pixel values of the image on which the smooth filtering processing is performed in a horizontal direction and a vertical direction, to obtain a first integral curve in the horizontal direction and a second integral curve in the vertical direction, respectively, and take a set of minimum points of the first integral curve and the second integral curve to determine a grid spacing line; and divide grid areas according to the grid spacing line.

Therefore, the smooth filtering processing is performed by using the box filter, so that other noise interference in the image can be weakened, so as to divide grid areas.

In some embodiments, a length or width of an operator of the box filter satisfies the following conditional expression:

$$\left\lceil \frac{dist}{2} - \mathrm{rad} \right\rceil < b < \left\lceil \frac{dist}{2} \right\rceil$$

where b is the length or width of the operator of the box filter; dist is the area interval of the areas of interest, rad is an area radius of the area of interest.

Referring to FIG. 14, in other embodiments, step S3 includes:

Step S34, detecting areas of interest in the deflection-corrected image by using a Hough circle transformation; and Step S35, forming circles according to the detected areas of interest, and performing an approximation to obtain the grid areas through division.

Specifically, steps S34 and S35 may be implemented by the processing module 13, that is, the processing module 13 may be configured to detect areas of interest in the deflection-corrected image by using a Hough circle transformation; and form circles according to the detected areas of interest, and performing an approximation to obtain the grid areas through division.

That is, for the division of the grid areas, the areas of interest in the deflection-corrected image may be detected by using the Hough circle transformation, and then circles are formed according to the detected areas of interest, and an approximation is performing to obtain the grid areas, thereby achieving the division of the grid areas.

Alternatively, the division of the grid areas may not be limited to the above embodiments, and other division methods may be adopted as needed to divide the grid areas, which are not specifically limited herein.

Referring to FIG. 15, in some embodiments, step S3 includes:

Step S41, throughout the grid areas, solving a mean square error of pixel values of each grid area corresponding to the preprocessed image;

Step S42, marking the corresponding sample of the area of interest as positive when the mean square error is greater than a mean square error threshold; and Step S43, marking the corresponding sample of the area of interest as negative when the mean square error is not greater than the mean square error threshold.

Specifically, step S41, step S42, and step S43 may be implemented by an identification module 14. That is, the identification module 14 may be configured to traverse the grid areas, and solve a mean square error of pixel values of each grid area corresponding to the preprocessed image; mark the corresponding sample of the area of interest as positive when the mean square error is greater than a mean square error threshold; and mark the corresponding sample of the area of interest as negative when the mean square error is not greater than the mean square error threshold.

In this way, the mean square error of pixel values of each grid area is compared with the mean square error threshold, which can distinguish the positive from the negative.

In some embodiments, the method for analyzing a biochip image includes: outputting an identification result for the positive or negative of the reaction chamber.

Specifically, the apparatus 10 for analyzing a biochip image includes an output module (not shown) configured to output the identification result for the positive or negative of the reaction chamber.

An embodiment of the present disclosure further provides a method for analyzing an image, including the steps of the method for analyzing a biochip image according to any one of the embodiments described above.

In the method for analyzing a biochip image and the apparatus 10 for analyzing a biochip image of the embodiment of the present disclosure, a fluorescent image with a high throughput and a low signal-to-noise ratio of the array type biochip can be effectively identified. Particularly, the problem of uneven fluorescent illumination of a microscopic chip can be solved through high-frequency filtering; the detection area having the maximum contour is formed by connecting areas of interest adjacent to each other in a same direction, and then, the principal component analysis (PCA) is used, so that the problem of the detection for the deflection angle can be solved; with the periodic pattern prior of the array type biochip, the notch filter is constructed, so that a noise caused by a surface dirt, a s sample injection process and a reaction process is weakened to the maximum extent; and thus, an automatic analysis for the positioning of chambers and the determination of the positive or negative of samples can be successfully realized.

Referring to FIG. 16, the embodiment of the present disclosure further provides a computer device 100, which includes a processor 110 and a memory 120 storing computer programs 122 therein, wherein the computer programs 122 are executed by the processor 110 to implement the method for analyzing a biochip image according to any of the above embodiments.

In one example, the computer programs 122, when executed by the processor 110, implement the following steps:

Step S1, acquiring a biochip image, and processing the biochip image to obtain a preprocessed image;

Step S2, randomly selecting a detection area and detecting reaction chambers in the detection area, and processing to obtain a deflection-corrected image;

Step S3, performing an enhancement processing on the deflection-corrected image, and identifying a positive or negative of an area of interest in the preprocessed image according to an image on which the enhancement processing is performed.

In the computer device 100 of the embodiment of the present disclosure, the computer programs 122 are executed by the processor 110, so that a fluorescent image with a high throughput and a low signal-to-noise ratio of the array type biochip can be effectively identified. Particularly, in the improved processing method, the problem of uneven fluorescent illumination of a microscopic chip can be solved through filtering; and an automatic analysis for the positioning of chambers and the determination of the positive or negative of samples can be successfully realized through the grid division.

An embodiment of the present disclosure further provides a storage medium having a computer program stored thereon, wherein the computer program is executed by one or more processors, the computer program implements the method for analyzing the biochip image according to any of the above embodiments.

In the description of the present specification, reference to the description of "one embodiment", "some embodiments", "illustrative embodiments", "examples", "specific examples", or "some examples" or the like means that a particular feature, structure, material, or characteristic described in connection with the embodiment or example is included in at least one embodiment or example of the present disclosure. In this specification, schematic representations of the above terms do not necessarily refer to the same embodiment or example. Furthermore, the particular features, structures, materials, or characteristics described may be combined in any suitable manner in any one or more embodiments or examples.

Any description for the process or method in flow charts or otherwise described herein may be understood as representing modules, segments, or portions of code which include one or more executable instructions for implementing steps of a custom logic function or process; and alternate implementations are included within the scope of the preferred embodiment of the present disclosure in which functions may be executed out of order from that shown or discussed, including substantially concurrently or in reverse order, depending on the functionality involved, as would be understood by one of ordinary skill in the art.

It will be understood by one of ordinary skill in the art that all or some of the steps in the method in the above embodiments may be implemented by hardware related to programs or instructions. The programs may be stored in a computer readable storage medium, and when executed, includes one or a combination of the steps of the method in the above embodiments.

In addition, functional units in the embodiments of the present disclosure may be integrated into one processing module, or exist alone physically, or two or more units are integrated into one module. The integrated module can be realized in a hardware module, and can also be realized in a software functional module. The integrated module, if implemented in the form of the software functional module and sold or used as a separate product, may also be stored in a computer readable storage medium. The above storage medium may be a read-only memory, a magnetic or optical disk, etc.

Although embodiments of the present disclosure have been shown and described above, it is understood that the above embodiments are exemplary and should not be construed as limiting the present disclosure; and that variations, modifications, substitutions and alterations in the above embodiments may be made by one of ordinary skill in the art within the scope of the present disclosure.

What is claimed is:

1. A method for analyzing a biochip image, comprising:
acquiring and preprocessing the biochip image to obtain a preprocessed image;
performing a correction for angle deflection on the preprocessed image to obtain a deflection-corrected image; and
performing an enhancement processing on the deflection-corrected image, and identifying a positive or negative of an area of interest in the preprocessed image according to an image on which the enhancement processing has been performed;
wherein the performing a correction for angle deflection on the preprocessed image to obtain a deflection-corrected image comprises:
selecting a preset number of detection areas in the preprocessed image;
detecting a center and a radius of each area of interest in each detection area by using a Hough circle transformation; and forming a circle according to the center and the radius of each area of interest, to determine the area of interest and segment the area of interest;

wherein the performing a correction for angle deflection on the preprocessed image to obtain a deflection-corrected image comprises:

performing an expansion processing on the segmented image to connect adjacent areas of interest in a preset direction;

performing a principal component analysis on a contour of the detection area having a maximum contour in the image on which the expansion processing is performed, to obtain a contour direction; and determining an image deflection angle according to the contour direction, to correct the preprocessed image and to obtain the deflection-corrected image;

wherein the performing a correction for angle deflection on the preprocessed image to obtain a deflection-corrected image comprises:

enlarging the selected area by a preset proportion, to randomly select the preset number of detection areas in the preprocessed image again; and repeatedly and iteratively detecting the image deflection angle until the image deflection angle is smaller than a preset angle threshold, to obtain the deflection-corrected image;

wherein a range of the preset angle threshold is determined by a following conditional expression:

$$\cos\theta - (\max\{m, n\} - 1)\cdot\sin\theta > \frac{2\,\text{rad}}{dist}$$

where $\theta$ is the preset angle threshold, dist is the area interval of the areas of interest, rad is an area radius of the area of interest, m is the number of rows of the areas of interest in each detection area, and n is the number of columns of the areas of interest in each detection area.

2. The method according to claim 1, wherein the performing a correction for angle deflection on the preprocessed image to obtain a deflection-corrected image comprises:

enlarging the selected area by a preset proportion, to randomly select the preset number of detection areas in the preprocessed image again; and repeatedly and iteratively detecting the image deflection angle for a preset number of times, to obtain the deflection-corrected image.

3. The method according to claim 1, wherein the performing an enhancement processing on the deflection-corrected image, and identifying a positive or negative of an area of interest in the preprocessed image according to an image on which the enhancement processing is performed comprises:

constructing a notch filter; and filtering the deflection-corrected image by using the notch filter, to obtain an image with enhanced periodic patterns.

4. The method according to claim 3, wherein the performing an enhancement processing on the deflection-corrected image, and identifying a positive or negative of an area of interest in the preprocessed image according to an image on which the enhancement processing is performed comprises:

performing a smooth filtering processing on the image with enhanced periodic patterns by using a box filter; integrating pixel values of the image on which the smooth filtering processing is performed in a horizontal direction and a vertical direction, to obtain a first integral curve in the horizontal direction and a second integral curve in the vertical direction, respectively, and taking a set of minimum points of the first integral curve and the second integral curve to determine a grid spacing line; and dividing grid areas according to the grid spacing line.

5. The method according to claim 4, wherein a length or width of an operator of the box filter satisfies a following conditional expression:

$$\left\lceil \frac{dist}{2} - \text{rad} \right\rceil < b < \left\lceil \frac{dist}{2} \right\rceil$$

where b is the length or width of the operator of the box filter; dist is the area interval of the areas of interest, rad is an area radius of the area of interest.

6. The method according to claim 4, wherein the performing an enhancement processing on the deflection-corrected image, and identifying a positive or negative of an area of interest in the preprocessed image according to an image on which the enhancement processing is performed comprises:

throughout the grid areas, solving a mean square error of pixel values of each grid area corresponding to the preprocessed image;

marking the corresponding sample of the area of interest as positive in response to the mean square error being greater than a mean square error threshold; and marking the corresponding sample of the area of interest as negative in response to the mean square error being not greater than the mean square error threshold.

7. The method according to claim 1, further comprising:

outputting an identification result for the positive or negative of the area of interest.

8. A non-transitory computer-readable storage medium storing computer programs thereon, wherein the computer programs, when executed by one or more processors, implement the method for analyzing a biochip image according to claim 1.

9. The method according to claim 1, wherein the acquiring and preprocessing the biochip image to obtain a preprocessed image comprises:

acquiring an original image, a camera intrinsic parameter matrix and a distortion coefficient; and correcting the original image according to the camera intrinsic parameter matrix and the distortion coefficient to obtain the biochip image.

10. The method according to claim 9, further comprising:

calibrating the camera for shooting by using a calibration plate and by adopting a traditional calibration method, to obtain the camera intrinsic parameter matrix and the distortion coefficient.

11. The method according to claim 9, wherein the original image is a fluorescent image of a biochip in which a biochemical reaction has occurred.

12. The method according to claim 1, wherein the preprocessed image comprises an image having a high-frequency component, and the acquiring and preprocessing the biochip image to obtain a preprocessed image comprises:

performing a Gaussian filtering processing on the biochip image to obtain an image having a low-frequency component; and subtracting the image having the low-frequency component from the biochip image to obtain the image having the high-frequency component.

13. The method according to claim 1, wherein the selecting a preset number of detection areas in the preprocessed image comprises:

selecting a corresponding detection area within a predetermined area of the preprocessed image.

14. The method according to claim 1, wherein each detection area is a rectangular area, and comprises at least two rows or at least two columns of areas of interest.

15. An apparatus for analyzing a biochip image, comprising:

an acquisition module configured to acquire and preprocess the biochip image to obtain a preprocessed image;

a correction module configured to perform a correction for angle deflection on the preprocessed image to obtain a deflection-corrected image; and a processing module configured to perform an enhancement processing on the deflection-corrected image, and identify a positive or negative of an area of interest in the preprocessed image according to an image on which the enhancement processing has been performed;

wherein the correction module is further configured to:

select a preset number of detection areas in the preprocessed image;

detect a center and a radius of each area of interest in each detection area by using a Hough circle transformation; and form a circle according to the center and the radius of each area of interest, to determine the area of interest and segment the area of interest;

wherein the correction module is further configured to:

perform an expansion processing on the segmented image to connect adjacent areas of interest in a preset direction;

perform a principal component analysis on a contour of the detection area having a maximum contour in the image on which the expansion processing is performed, to obtain a contour direction; and determine an image deflection angle according to the contour direction, to correct the preprocessed image and to obtain the deflection-corrected image;

wherein the correction module is further configured to:

enlarge the selected area by a preset proportion, to randomly select the preset number of detection areas in the preprocessed image again; and repeatedly and iteratively detect the image deflection angle until the image deflection angle is smaller than a preset angle threshold, to obtain the deflection-corrected image;

wherein a range of the preset angle threshold is determined by a following conditional expression:

$$\cos\theta - (\max\{m, n\} - 1)\cdot\sin\theta > \frac{2\,\mathrm{rad}}{dist}$$

where $\theta$ is the preset angle threshold, dist is the area interval of the areas of interest, rad is an area radius of the area of interest, m is the number of rows of the areas of interest in each detection area, and n is the number of columns of the areas of interest in each detection area.

16. A computer device, comprising a processor and a memory, wherein the memory stores computer programs thereon which, when executed by the processor, implement the method for analyzing a biochip image according to claim 1.

17. The apparatus according to claim 15, wherein the acquisition module is further configured to:

acquire an original image, a camera intrinsic parameter matrix and a distortion coefficient; and correct the original image according to the camera intrinsic parameter matrix and the distortion coefficient to obtain the biochip image.

18. The apparatus according to claim 17, wherein the original image is a fluorescent image of a biochip in which a biochemical reaction has occurred.

19. The apparatus according to claim 15, wherein the correction module is further configured to:

select a corresponding detection area within a predetermined area of the preprocessed image.

20. The apparatus according to claim 15, wherein each detection area is a rectangular area, and comprises at least two rows or at least two columns of areas of interest.

* * * * *